United States Patent [19]
Hunsbedt

[11] Patent Number: 5,499,277
[45] Date of Patent: Mar. 12, 1996

[54] METHOD AND APPARATUS FOR ENHANCING REACTOR AIR-COOLING SYSTEM PERFORMANCE

[75] Inventor: Anstein Hunsbedt, Los Gatos, Calif.

[73] Assignee: General Electric Company, San Jose, Calif.

[21] Appl. No.: 293,868

[22] Filed: Aug. 19, 1994

[51] Int. Cl.⁶ ................................... G21C 15/18
[52] U.S. Cl. ........................... 376/299; 376/290
[58] Field of Search ....................... 376/299, 298, 376/290, 292, 293, 367, 368

[56] References Cited

U.S. PATENT DOCUMENTS

| | | | |
|---|---|---|---|
| 4,959,193 | 9/1990 | Hunsbedt et al. | 376/299 |
| 5,043,135 | 8/1991 | Hunsbedt et al. | 376/299 |
| 5,223,210 | 6/1993 | Hunsbedt et al. | 376/299 |
| 5,339,340 | 8/1994 | Hunsbedt | 376/299 |
| 5,406,602 | 4/1995 | Hunsbedt et al. | 376/299 |

FOREIGN PATENT DOCUMENTS

| | | |
|---|---|---|
| 0960789 | 6/1964 | United Kingdom . |
| 0967901 | 8/1964 | United Kingdom . |
| 1210048 | 10/1970 | United Kingdom . |
| 1247897 | 9/1971 | United Kingdom . |
| 1258763 | 12/1971 | United Kingdom . |

*Primary Examiner*—Daniel D. Wasil
*Attorney, Agent, or Firm*—James E. McGinness

[57] ABSTRACT

An enhanced decay heat removal system for removing heat from the inert gas-filled gap space between the reactor vessel and the containment vessel of a liquid metal-cooled nuclear reactor. Multiple cooling ducts in flow communication with the inert gas-filled gap space are incorporated to provide multiple flow paths for the inert gas to circulate to heat exchangers which remove heat from the inert gas, thereby introducing natural convection flows in the inert gas. The inert gas in turn absorbs heat directly from the reactor vessel by natural convection heat transfer.

19 Claims, 4 Drawing Sheets

METHOD AND APPARATUS FOR ENHANCING REACTOR AIR-COOLING SYSTEM PERFORMANCE

The Government of the United States of America has rights in this invention in accordance with Contract No. DE-AC03-89SF17445 awarded by the Department of Energy.

FIELD OF THE INVENTION

The present invention relates generally to liquid metal-cooled nuclear reactors and to air cooling thereof. In particular, the invention relates to the passive removal of reactor decay and sensible heat from a liquid metal reactor and the transport of the heat to a heat sink (i.e., atmospheric air) by the inherent processes of conduction and radiation of heat and natural convection of fluids.

BACKGROUND OF THE INVENTION

In the Advanced Liquid Metal Reactor (ALMR), a reactor core of fissionable fuel is submerged in a hot liquid metal, such as liquid sodium, within a reactor vessel. The liquid metal is used for cooling the reactor core, with the heat absorbed thereby being used to produce power in a conventional manner.

A known version of an ALMR plant has a concrete silo which is annular or circular. The silo is preferably disposed underground and contains concentrically therein an annular containment vessel in which is concentrically disposed a reactor vessel having a nuclear reactor core submerged in a liquid metal coolant such as liquid sodium. The annular space between the reactor and containment vessels is filled with an inert gas such as argon. The reactor and containment vessels are supported or suspended vertically downward from an upper frame, which in turn is supported on the concrete silo by a plurality of conventional seismic isolators to maintain the structural integrity of the containment and reactor vessels during earthquakes and allow uncoupled movement between those vessels and the surrounding silo.

Operation of the reactor is controlled by neutron-absorbing control rods which are selectively inserted into or withdrawn from the reactor core. During operation of the reactor, it may be necessary to shut down the fission reaction of the fuel for the purpose of responding to an emergency condition or performing routine maintenance. The reactor is shut down by inserting the control rods into the core of fissionable fuel to deprive the fuel of the needed fission-producing neutrons. However, residual decay heat continues to be generated from the core for a certain time. This heat must be dissipated from the shut-down reactor.

The heat capacity of the liquid metal coolant and adjacent reactor structure aid in dissipating the residual heat. For instance, heat is transferred by thermal radiation from the reactor vessel to the containment vessel. As a result, the containment vessel experiences an increase in temperature. Heat from the containment vessel will also radiate outwardly toward a concrete silo spaced outwardly therefrom. These structures may not be able to withstand prolonged high temperatures. For example, the concrete making up the walls of the typical silo may splay and crack when subjected to high temperatures.

To prevent excessive heating of these components, a system for heat removal is provided. One of the heat removal systems incorporated in the ALMR is entirely passive and operates continuously by the inherent processes of conduction and radiation of heat and natural convection of fluids. This safety-related system, referred to as the reactor vessel auxiliary cooling system (RVACS), is shown schematically in FIG. 1. Heat is transported from the reactor core to the reactor vessel 15 by natural convection of liquid sodium. The heat is then conducted through the reactor vessel wall. Heat transfer from the reactor vessel outside surface to the colder containment vessel 7 across a gap space 16 filled with an inert gas, such as argon, is almost entirely by thermal radiation. A heat collector cylinder 4 is disposed concentrically between the containment vessel 7 and the silo 5 to define a hot air riser 6 between the containment vessel and the inner surface of the heat collector cylinder, and a cold air downcomer 3 between the silo and the outer surface of the heat collector cylinder. Heat is transferred from the containment vessel 7 to the air in the hot air riser 6. The inner surface of heat collector cylinder 4 receives thermal radiation from the containment vessel, with the heat therefrom being transferred by natural convection into the rising air for upward flow to remove the heat via air outlets 9. Heat transfer from the containment vessel outer surface is approximately 50% by natural convection to the naturally convecting air in the hot air riser 6 and 50% by radiation to the heat collector cylinder 4.

Heating of the air in the riser 6 by the two surrounding hot steel surfaces induces natural air draft in the system, with atmospheric air entering through four air inlets 1 above ground level. The air is ducted to the cold air downcomer 3 via the inlet plenum 2, then to the bottom of the concrete silo 5, where it turns and enters the hot air riser 6. The hot air is ducted to the four air outlets 9 above ground level via the outlet plenum 8. The outer surface of heat collector cylinder 4 is covered with thermal insulation (not shown) to reduce transfer of heat from heat collector cylinder 4 into silo 5 and into the air flowing downward in cold air downcomer 3. The greater the differential in temperature between the relatively cold downcomer air and the relatively hot air within the riser, the greater will be the degree of natural circulation for driving the air cooling passively, e.g., without motor-driven pumps.

The overall heat removal rate of the RVACS increases with temperature and is controlled to a large degree in the air riser gap by convective heat transfer from enclosing surfaces. Thus, if it were possible to increase the convective heat transfer on these surfaces or increase the exposed surface area, a larger decay heat load would be rejected by the RVACS at any given reactor assembly temperature.

Two methods of enhancing the RVACS performance by such means are respectively described in U.S. Pat. No. 5,043,135 to Hunsbedt et al., entitled "Method for Passive Cooling Liquid Metal Cooled Nuclear Reactors and Systems Thereof", and in U.S. Pat. No. 5,339,340 to Hunsbedt, entitled "Method for Enhancing Air-Side Heat Transfer to Achieve Improved Reactor Air-Cooling System Performance".

U.S. Pat. No. 5,043,135 describes an air-side heat transfer surface preparation technique that results in a higher air-side convective heat transfer rate. It involves the creation of surface roughness by placement of protrusions 10 (see FIG. 2) that disturb the thermal boundary layer near the hot steel walls.

An additional enhancement method described in U.S. Pat. No. 5,339,340 utilizes the air-side enhancement method of U.S. Pat. No. 5,043,135 in combination with an additional, perforated collector cylinder 11 (see FIG. 2) placed in the air stream. The use of a perforated steel cylinder is unique in that the degree and shape of the perforations can be adjusted and selected such that optimum air-side heat transfer is achieved.

The supplementary decay heat removal system which is the subject of the present invention can be used by itself but is more effective when used in combination with the enhancements of U.S. Pat. Nos. 5,043,135 and 5,339,340. This approach is assumed in the following discussion.

SUMMARY OF THE INVENTION

The present invention is an improvement which seeks to enhance the performance of the aforementioned prior art passive air cooling system. In the enhanced decay heat removal method described herein, heat is removed from the annular region filled with an inert gas between the outside surface of the reactor vessel and the inside surface of the containment vessel. This heat removal is in addition to the heat removed by the RVACS. The enhanced method is unique in that multiple cooling ducts in flow communication with the inert gas-filled gap space are added to provide multiple flow paths for the inert gas to circulate to heat exchangers. Heat in the inert gas is removed in these heat exchangers, thereby introducing natural convection flows in the inert gas, which in turn absorbs heat directly from the reactor vessel by natural convection heat transfer and acting in unison with the conventional decay heat removal system. The total passive convective heat transfer of the resulting dual decay heat removal system is thereby increased since heat is removed directly from both the reactor and containment vessel surfaces by natural convection.

The use of the prior art enhancement methods described above along with the enhancement heat removal means of the present invention can result in improved temperature margins in the reactor design. In the alternative, the reactor core size could be increased for a particular vessel size to the extent other design constraints will permit. This could lead to a more compact and economical reactor design for future LMR systems. Also, the passive cooling system concept could be adapted to future, large-size reactors for which this type of passive heat removal system has to date been shown to be less than satisfactory because of the relatively low heat fluxes achievable.

DETAILED DESCRIPTION OF THE PREFERRED EMBODIMENTS

The focus of the enhancements disclosed in U.S. Pat. Nos. 5,043,135 and 5,339,340 was the annular space in the air riser gap 6 between the outside surface of the containment vessel 7 and the inside surface of the collector cylinder 4, as shown in detail in FIG. 2. Heat is normally transferred to the air stream from these surfaces by convection. In the design of the conventional ALMR, these smooth surfaces have roughness that is characteristic of commercially available, nuclear-grade stainless steels. In accordance with the teaching of U.S. Pat. No. 5,043,135, the surface roughness was increased by creating surface protrusions or boundary layer trips 10 oriented in a direction essentially perpendicular to the air flow direction, e.g., circumferentially around the cylindrical surface of the containment vessel 7.

Figure 1:
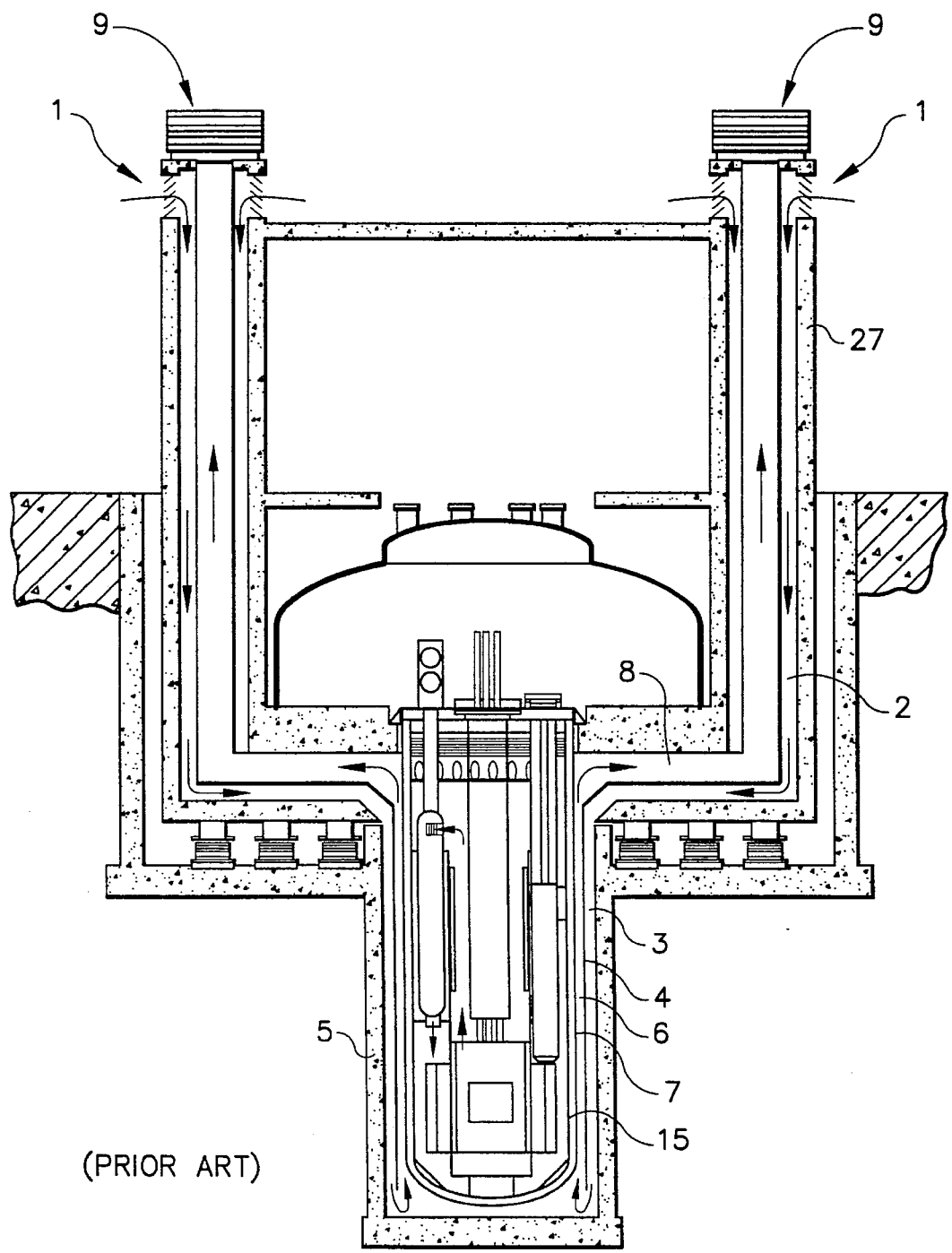
FIG. 1 is an elevation view of a conventional liquid metal-cooled nuclear reactor, showing the reactor vessel auxiliary cooling system.
Figure 2:
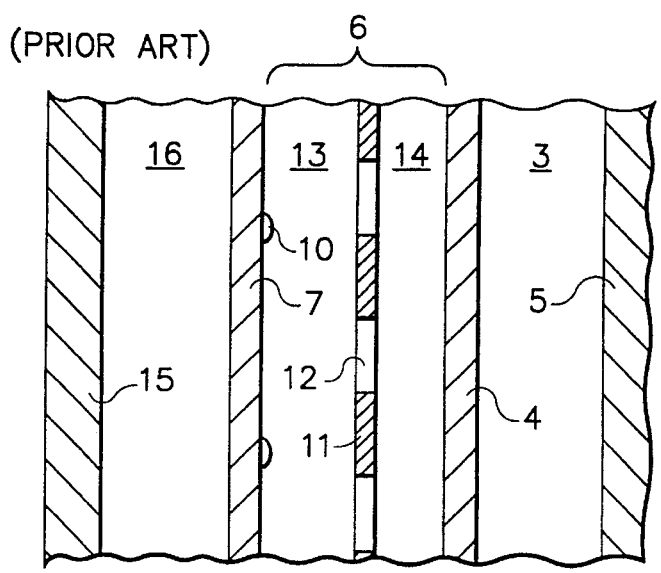
FIG. 2 is a fragmentary azimuthal sectional view of a detailed portion of the reactor shown in FIG. 1.

The enhancement of U.S. Pat. No. 5,339,340 involves placing a perforated collector cylinder 11, having multiple openings or holes 12 as indicated in FIG. 2, in the hot air riser 6. The holes 12 can be of arbitrary shape, although a circular shape would be the most economical from a manufacturing standpoint. The degree of perforation, i.e., the total surface of the openings compared to the total perforated collector cylinder surface area, is a variable and can be selected to provide optimum thermal performance. The purpose of the holes 12 is to allow a fraction of the thermal radiative heat flow emanating from the containment vessel 7 to reach and be absorbed by the collector cylinder 4. The remainder of the radiative heat flux is absorbed by the perforated collector cylinder 11. Thus, the surfaces of both the collector cylinder 4 and the perforated collector cylinder 11 receive heat by radiative heat transfer. The fraction that each will receive can be controlled by the degree of perforation selected for the perforated collector cylinder 11. The degree of perforation will be based on an optimization study to achieve maximum overall convective heat transfer from all the heat transfer surfaces in the hot air riser 6. The convective heat transfer rate to the air (the heat sink) depends on the temperature difference between the steel surface and air, and the convective heat transfer coefficient, which in turn depend on the air flow velocities in the individual flow channels created by the perforated collector cylinder 11, namely, inner channel 13 and outer channel 14. The overall optimization process must consider the proper positioning of perforated collector cylinder 11 in relation to the adjacent walls of containment vessel 7 and collector cylinder 4 to achieve the desired air flow distribution between the inner and outer flow channels. The relative positioning of the perforated collector cylinder 11 will also depend on the boundary layer trip configuration if these are included in the heat transfer system.

With the air-side RVACS enhancement features of U.S. Pat. Nos. 5,043,135 and 5,339,340 included in the present design, the heat transfer resistance in the inert-gas gap 16 between the reactor vessel 15 and the containment vessel 7 becomes controlling. Since almost all heat transfer in this gap is by thermal radiation, some improvement in the overall heat rejection capability of the RVACS might be achieved by improving the thermal emissivities of the vessel surfaces. However, significant further increase in the thermal emissivities of these surfaces is not possible because they have already been increased by applying carefully prepared oxide layers. Thus, to further improve the passive heat removal capability, other means must be adopted.

In accordance with the present invention, enhancement of the passive heat removal capability in an AMLR is achieved by introducing means for removing heat directly from the inert gas in the gap space 16 and inducing significant natural convection flows in the gap space. The increased flow velocities in the gap space 16 result in higher convective heat transfer between the reactor vessel 15 and the containment vessel 7. In addition, RVACS performance is increased in an indirect manner because more draft head and associated RVACS air flow result, as explained hereinafter. Thus, the overall performance of the composite or dual RVACS in accordance with the invention is increased. The degree of increase depends to a large extent on the investment one is willing to make in the inert gas/RVACS air exchanger.

The design and operation of the heat removal enhancement means in accordance with the preferred embodiment of the invention is explained with reference to FIGS. 3–6.

Figure 4:
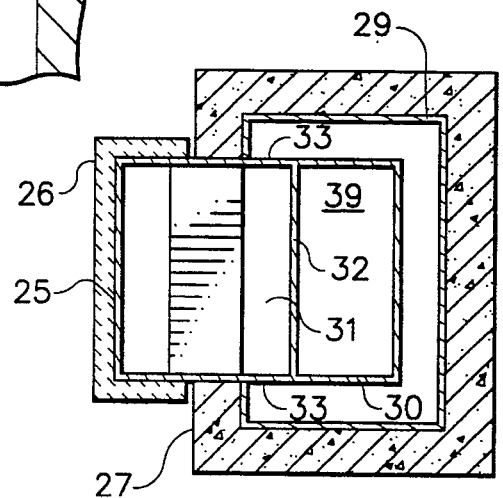
FIG. 4 is a plan view at or near the RVACS outlet plenum showing the reactor assembly cross section and proposed ducting attached to the containment vessel of the reactor depicted in FIG. 3.
Figure 5:
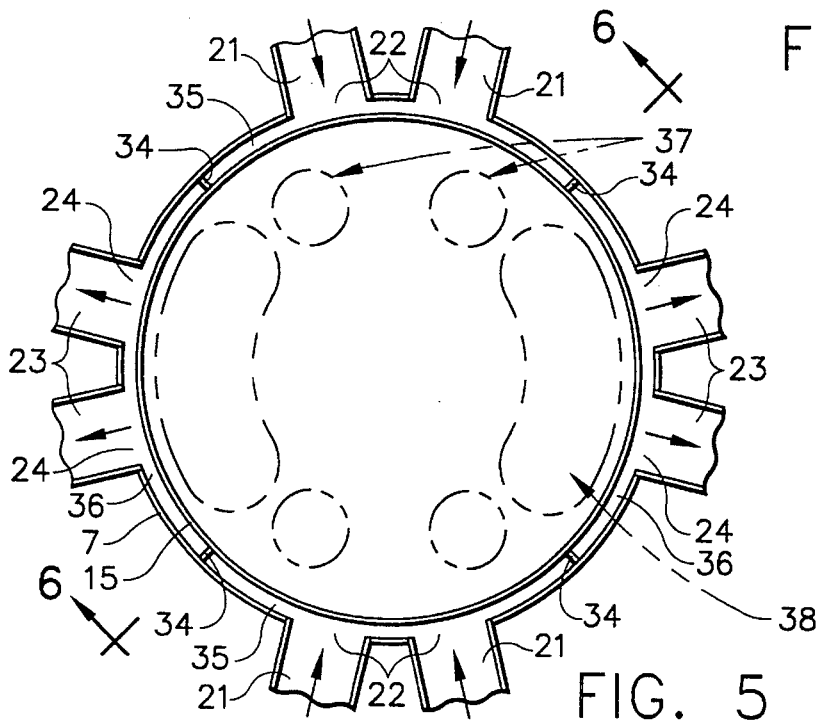
FIG. 5 is a diagram of one RVACS stack (shown in cross section) as modified by the present invention to include an inert gas/RVACS air heat exchanger.
Figure 3:
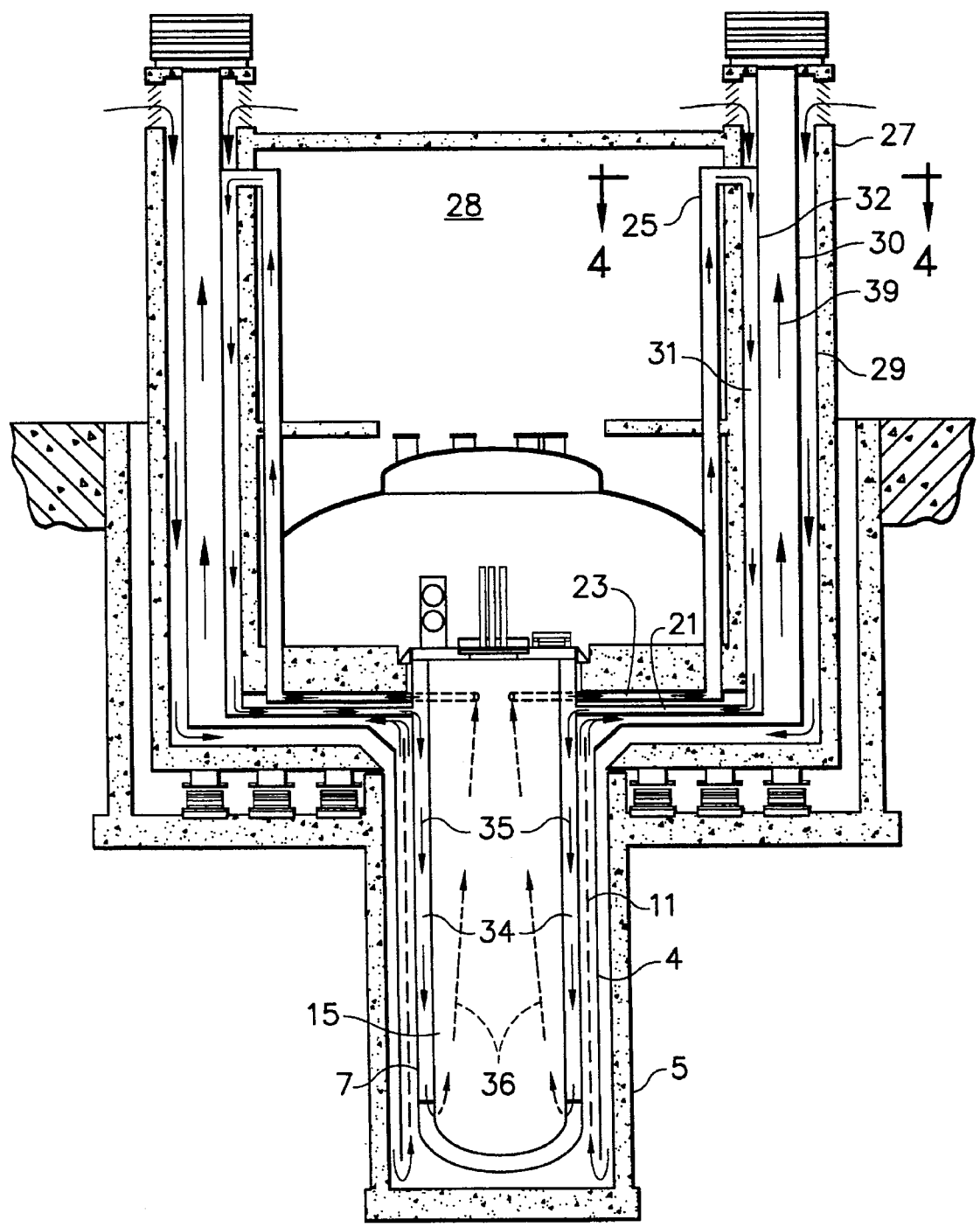
FIG. 3 is an elevation view of a liquid metal-cooled nuclear reactor in accordance with a preferred embodiment of the present invention.

In accordance with the invention, four inert gas inlet ducts 21 extend horizontally into the outlet plenum and are attached to the wall of the containment vessel 7, as indicated in FIGS. 3 and 4. The inlet ducts 21 are in flow communication with the inert gas-filled gap space 16 (see FIG. 2) via four inlet openings 22 (see FIG. 4). Similarly, four inert gas outlet ducts 23 are also attached to the containment vessel at approximately the same elevation as the inlet ducts 21 and communicate with the inert gas-filled gap space 16 via four outlet openings 24, each of which is positioned at an angular location which is essentially 90° from the corresponding inlet opening 22, as best seen in FIG. 5. Each reactor assembly quadrants has one inlet opening 22 and one outlet opening 24. The design is further modified by including four vertical inert gas riser ducts 25 positioned adjacent to the four RVACS stacks 27 along the entire length of the stack located within the refueling enclosure 28. Each inert gas riser duct 25 is in flow communication at its bottom end with a corresponding one of the four inert gas outlet ducts 23, as shown in FIG. 3, and is covered with thermal insulation 26, as shown in FIG. 4. In addition, each riser duct 25 extends horizontally at the top end thereof through the wall of the associated RVACS stack 27, into the RVACS inlet ducts 29 and joining with one long side of the rectangular RVACS outlet ducts 30, as indicated in FIGS. 3 and 4.

Inert gas downcomer ducts 31 are formed by one long side of the RVACS outlet duct 30–which now serves as an inert gas/RVACS air heat exchanger 32; part of the long wall of the RVACS inlet duct 29 adjacent to and opposing the heat exchanger 32; and side walls 33 formed by extending the two short side walls of the RVACS outlet ducts 30 until they join with the opposing wall of the RVACS inlet duct 29, as indicated in FIG. 4. Each downcomer duct 31 extends the entire length of the associated RVACS stack 27. The bottom end of each downcomer duct 31 joins in flow communication with the associated inert gas inlet duct 21, as indicated in FIG. 3. The preferred embodiment of the inert gas/RVACS air heat exchanger 32 described herein is but one of a large number of possible designs that could be considered and which would be acceptable from a structural point of view. However, the disclosed preferred embodiment is considered to be the best mode because it minimizes the modification needed to incorporate the inert gas/RVACS air heat exchanger of the present invention in a conventional plant.

Figure 6:
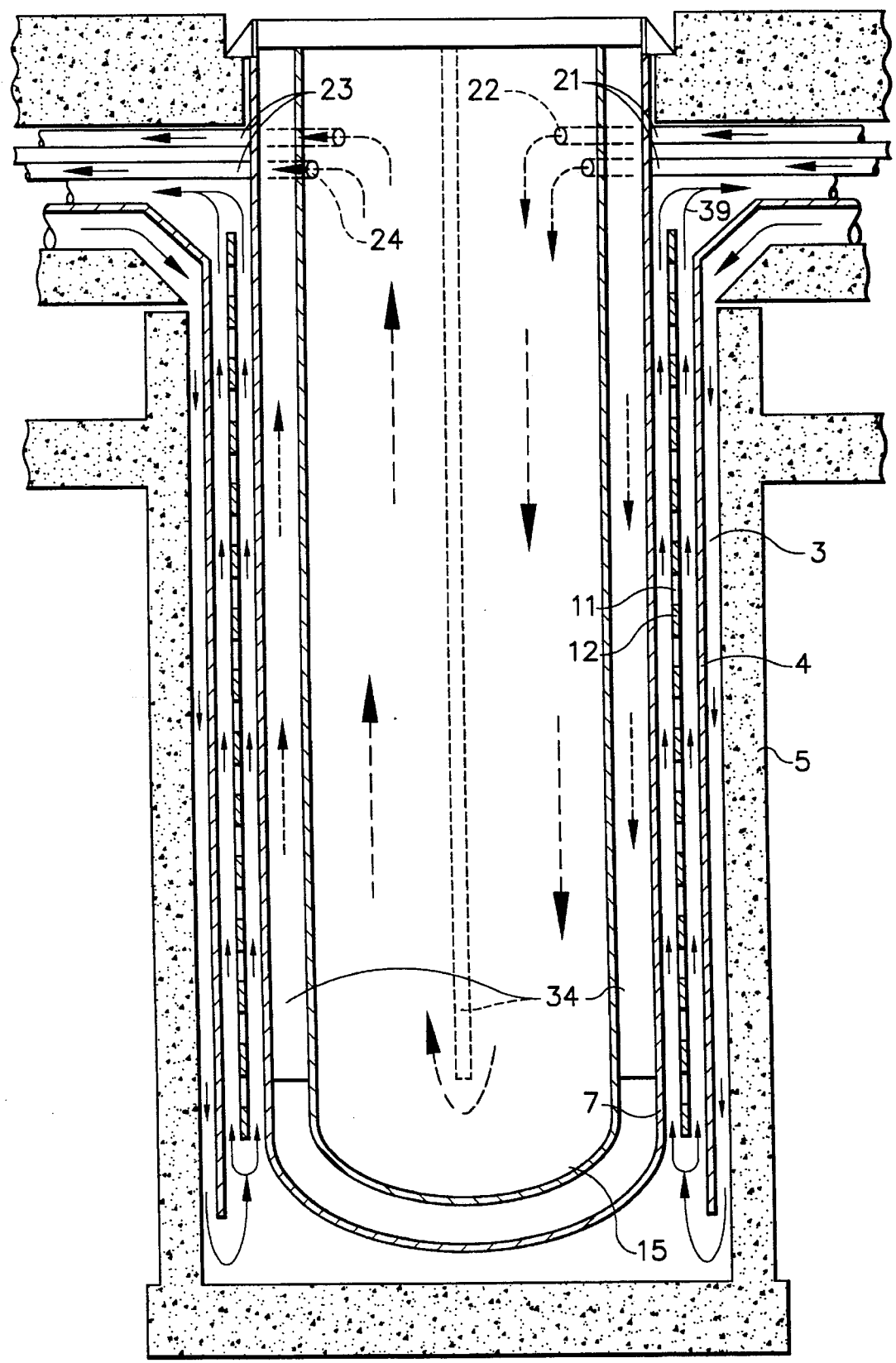
FIG. 6 is a diagram showing the flow of inert gas around one of a plurality of baffles placed in the inert gas-filled annular space between the reactor vessel and the containment vessel of the reactor.

In accordance with the invention, modifications are made to the conventional reactor assembly design as indicated in FIGS. 5 and 6. Four flow baffles 34 are placed in the inert gas-filled gap space 16 at 90° intervals along the circumference. These baffles extend from near the top of the reactor vessel 15 and the containment vessel 7 to near the bottom of the cylindrical portions of the vessels. Thus, these flow baffles define four quadrants, two of which are denoted as downflow zones 35 and two of which are denoted as upflow zones 36. The downflow zones 35 are located at circumferential positions corresponding to the inlet openings 22 and the upflow zones 36 are located at circumferential positions corresponding to the outlet openings 24. Note in FIG. 5 that the downflow zones 35 are positioned radially outside of the two sets of electromagnetic pumps 37 whereas the upflow zones 36 are positioned radially outside of the intermediate heat exchangers 38. [Pumps 37 and heat exchangers 38 are conventional components disclosed, for example, in U.S. Pat. No. 4,882,514 to Brynsvold et al.] The reason for this orientation is that the regions of the reactor vessel 15 outside of the intermediate heat exchangers 38 are normally hotter than the regions outside the electromagnetic pumps 37, which will tend to promote flow patterns of the inert gas around the bottom of each baffle as shown in FIG. 6.

During operation of the heat removal enhancement means of the present invention, the inert gas in the two upflow zones 36 will rise because vessel surface temperatures are higher in these zones. The inert gas then proceeds through the four outlet openings 24 into the four inert gas outlet ducts 23 and thereafter into the four inert gas riser ducts 25. Each inert gas riser duct is positioned adjacent to a corresponding one of four RVACS stacks 27, as indicated in FIGS. 3 and 5. From there the hot inert gas is ducted into the four inert gas downcomer ducts 31, where the inert gas is cooled by the inert gas/RVACS air heat exchangers 32. The cooled inert gas then flows in sequence through the four inert gas inlet ducts 21, the two downflow zones 35 and then the four inlet openings 22. The cooled inert gas is heated as it is directed downward, but the upward buoyancy thus created is overcome by the much larger positive head created in the elevated inert gas/RVACS air heat exchangers 32. The inert gas flows laterally near the bottom of the reactor assembly, as indicated in FIG. 6, in the open space below the end points of the flow baffles 34 and then enters the two upflow zones 36. The inert gas is heated further as it flows upwards in the upflow zones and then repeats the entire inert gas flow path again.

Operation of the dual RVACS increases the decay heat removal capability in three different ways. First, heat is removed directly from the reactor vessel outside surface by the circulating inert gas and transferred to the RVACS outlet air 39 in each inert gas/RVACS air heat exchanger 32. This contribution to the improvement in RVACS performance is by far the largest, perhaps being as much as 90% of the total when the heat exchanger surface area (A) is large. Second, heat is transferred to the containment vessel 7 by the vigorous natural convection flow created in the inert gas-filled gap space 16, which heat is in turn transferred to the conventional RVACS air stream. Finally, the RVACS air flow rate and thereby its performance are increased because heat is added to the RVACS outlet air 39 in the inert gas/RVACS air heat exchangers 32, which provides increased natural circulation head and RVACS flow rate, thus increasing air-side heat transfer coefficients as well as surface-to-air temperature differences.

In specific preliminary analysis cases considered for the dual RVACS concept utilizing the enhancement methods described in U.S. Pat. Nos. 5,043,135 and 5,339,340, using a UA product parameter [UA is the product of the heat exchanger overall heat transfer coefficient U and the heat exchanger surface area A] value of 3320 Btu/hr-°F corresponding to utilizing one long side of the RVACS air outlet duct 30 for the inert gas/RVACS air heat exchanger as shown in FIGS. 3 and 5, the overall performance of the dual RVACS increased by about 13%. The corresponding reactor core power that would be possible without reducing the RVACS temperature margin is about 950 MW, corresponding to an estimated net reduction in bussbar cost of 4 mills/kWh. Further increases are possible by simply providing more heat exchanger surface area. For the other analysis case considered, where all of the RVACS air outlet duct was used as inert gas/RVACS air heat exchanger area, it was determined that by using the dual RVACS of the present invention, the reactor core power can be increased from 840 to 985 MW$_t$ (i.e., a 17.5% increase), resulting in an estimated bussbar cost reduction of 5 mills/kWh. Such a power increase must be consistent with other design constraints that might exist in the current ALMR. However, if this power increase could be implemented, significant net reduction in the electric power generating cost could be realized.

Thus, the basic concept of the invention is that heat is removed directly from the reactor vessel outside surface by circulating inert gas. The heated inert gas then circulates via multiple flow paths through heat exchangers which remove heat from the inert gas. The cooled inert gas then flows by natural circulation back to the annular space between the reactor vessel and the containment vessel. This concept has been illustrated by disclosure of the foregoing preferred embodiment. However, it is understood that this novel concept is subject to change following trade-off and detailed thermal performance evaluations without departing from the spirit and scope of the invention. Also, routine variations and modifications of the disclosed apparatus will be readily apparent to practitioners skilled in the art of passive air cooling systems in ALMRs. For example, the heat exchangers could also be arranged to reject heat directly to atmospheric air which is not a part of the RVACS air cooling stream. All such variations and modifications are intended to be encompassed by the claims set forth hereinafter.

I claim:

1. A liquid metal-cooled nuclear reactor comprising a containment vessel, a reactor vessel surrounded by said containment vessel with an inert gas-filled gap space therebetween, a nuclear fuel core arranged inside said reactor vessel, a heat collector cylinder surrounding said containment vessel with a space therebetween, a silo surrounding said heat collector cylinder, an air inlet duct and an air outlet duct in flow communication with atmospheric air external to said reactor, a cold air downcomer gap in flow communication with said air inlet duct and extending between said heat collector cylinder and said silo, a hot air riser gap in flow communication with said cold air downcomer gap and said air outlet duct and extending between said heat collector cylinder and said containment vessel, an inert gas inlet duct and an inert gas outlet duct in flow communication with said inert gas-filled gap space, an inert gas downcomer duct in flow communication with said inert gas inlet duct and an inert gas riser duct in flow communication with said inert gas outlet duct and with said inert gas downcomer duct, wherein said inert gas downcomer duct and said air outlet duct share a common wall made of heat conductive material for removing heat from said inert gas by heat exchange with atmospheric air, wherein said inert gas downcomer duct and said inert gas riser duct are not annular.

2. The liquid metal-cooled nuclear reactor as defined in claim 1, further comprising thermal insulation applied to at least a portion of the outer surface of said inert gas riser duct.

3. The liquid metal-cooled nuclear reactor as defined in claim 1, further comprising an electromagnetic pump and a heat exchanger arranged inside said reactor vessel, and first, second and third baffles arranged vertically in said insert gas-filled gap space, said first and second baffles, in conjunction with said reactor vessel and said containment vessel, defining a first channel for the flow of inert gas, and said second and third baffles, in conjunction with said reactor vessel and said containment vessel, defining a second channel for the flow of inert gas, said first channel being in flow communication with said inert gas outlet duct and located radially outside said heat exchanger, and said second channel being in flow communication with said inert gas inlet duct and said first channel and located radially outside said electromagnetic pump.

4. The liquid metal-cooled nuclear reactor as defined in claim 1, further comprising a stack which surrounds said air inlet duct, said air outlet duct and said inert gas downcomer duct.

5. The liquid metal-cooled nuclear reactor as defined in claim 4, wherein said inert gas downcomer duct communicates with said inert gas riser duct via a horizontal duct which penetrates said stack.

6. The liquid metal-cooled nuclear reactor as defined in claim 1, wherein said inert gas downcomer duct and said air inlet duct share a common wall.

7. A system for removing heat from a liquid metal-cooled nuclear reactor in which a reactor vessel is surrounded by a containment vessel with a fluid-filled gap space therebetween, comprising:

a fluid outlet duct in flow communication with said fluid-filled gap space;

a fluid inlet duct in flow communication with said fluid-filled gap space;

a fluid riser duct in flow communication with said fluid outlet duct;

a fluid downcomer duct in flow communication with said fluid inlet duct and said fluid riser duct; and air circulation flowpath means in flow communication with atmospheric air external to said reactor, wherein said air circulation flowpath means has a first section in heat exchange relationship with said containment vessel and a second section in heat exchange relationship with said fluid downcomer duct, whereby heat is removed from fluid in said fluid downcomer duct by heat exchange with atmospheric air in said air circulation flowpath means, wherein said fluid gas downcomer duct and said fluid riser duct are not annular.

8. The heat removal system as defined in claim 7, further comprising thermal insulation applied to at least a portion of the outer surface of said inert gas riser duct.

9. The heat removal system as defined in claim 7, further comprising a stack which surrounds said air inlet duct, said air outlet duct and said inert gas downcomer duct.

10. The heat removal system as defined in claim 9, wherein said inert gas downcomer duct communicates with said inert gas riser duct via a horizontal duct which penetrates said stack.

11. The heat removal system as defined in claim 9, wherein said stack is made of thermally insulating material.

12. The heat removal system as defined in claim 7, wherein said fluid is an inert gas.

13. In a liquid metal-cooled nuclear reactor comprising a containment vessel, a reactor vessel surrounded by said containment vessel with an inert gas-filled gap space therebetween, a nuclear fuel core arranged inside said reactor vessel, a heat collector cylinder surrounding said containment vessel with a space therebetween, a silo surrounding said heat collector cylinder, first and second air inlet ducts in flow communication with atmospheric air external to said reactor, first and second air outlet ducts in flow communication with atmospheric air external to said reactor, a cold air downcomer gap in flow communication with said first and second air inlet ducts and extending between said heat collector cylinder and said silo, a hot air riser gap in flow communication with said cold air downcomer gap and said first and second air outlet ducts and extending between said heat collector cylinder and said containment vessel, the improvement comprising first and second inert gas circulation loops in flow communication with said inert gas-filled gap space, said first inert gas circulation loop being in heat exchange relationship with said first air outlet duct and said second inert gas circulation loop being in heat exchange relationship with said second air outlet duct, and first through fourth baffles arranged vertically in said insert gas-filled gap space, said first through fourth baffles, in conjunction with said reactor vessel and said containment vessel, defining first through fourth channels for the flow of inert gas, said first and second channels being in flow communication with respective ends of said first inert gas circulation loop, and said third and fourth channels being in flow communication with respective ends of said second inert gas circulation loop.

14. The liquid metal-cooled nuclear reactor as defined in claim 13, further comprising first and second electromagnetic pumps arranged inside said reactor vessel at generally diametrally opposed first and second azimuthal positions, and first and second heat exchangers arranged inside said reactor vessel at generally diametrally opposed third and fourth azimuthal positions intermediate said first and second azimuthal positions, wherein said first and third channels are located radially outside said first and second heat exchangers respectively, and said second and fourth channels are located radially outside said first and second electromagnetic pumps.

15. The liquid metal-cooled nuclear reactor as defined in claim 13, wherein each of said first through fourth baffles extends from a highest elevation of said fluid-filled gap space to an elevation above a lowest elevation of said fluid-filled space so that inert gas may flow from one of said first through fourth channels to an adjacent one of said first through fourth channels around a bottom of a respective one of said first through fourth baffles therebetween.

16. The liquid metal-cooled nuclear reactor as defined in claim 13, wherein each of said first and second inert gas circulation loops comprises an inert gas inlet duct and an inert gas outlet duct in flow communication with said inert gas-filled gap space, an inert gas downcomer duct in flow communication with said inert gas inlet duct and an inert gas riser duct in flow communication with said inert gas outlet duct and with said inert gas downcomer duct, wherein said inert gas downcomer duct of said first inert gas circulation loop and said first air outlet duct share a common wall made of heat conductive material, and said inert gas downcomer duct of said second inert gas circulation loop and said second air outlet duct share a common wall made of heat conductive material.

17. The liquid metal-cooled nuclear reactor as defined in claim 16, further comprising a first stack which surrounds said first air inlet duct, said first air outlet duct and said inert gas downcomer duct of said first inert gas circulation loop, and a second stack which surrounds said second air inlet duct, said second air outlet duct and said inert gas downcomer duct of said second inert gas circulation loop.

18. The liquid metal-cooled nuclear reactor as defined in claim 17, wherein said inert gas downcomer duct of said first inert gas circulation loop communicates with said inert gas riser duct of said first inert gas circulation loop via a horizontal duct which penetrates said first stack.

19. The liquid metal-cooled nuclear reactor as defined in claim 16, wherein said inert gas downcomer duct of said first inert gas circulation loop and said first air inlet duct share a common wall.

\* \* \* \* \*